US010571356B2

(12) United States Patent
Hun et al.

(10) Patent No.: US 10,571,356 B2
(45) Date of Patent: Feb. 25, 2020

(54) FLUORESCENT AIR LEAKAGE DETECTION SYSTEM FOR ENCLOSURES

(71) Applicant: UT-Battelle, LLC, Oak Ridge, TN (US)

(72) Inventors: Diana E. Hun, Lenoir City, TN (US); Brenda A. Smith, Knoxville, TN (US); Linda A. Lewis, Andersonville, TN (US)

(73) Assignee: UT-Battelle, LLC, Oak Ridge, TN (US)

(*) Notice: Subject to any disclaimer, the term of this patent is extended or adjusted under 35 U.S.C. 154(b) by 119 days.

(21) Appl. No.: 15/703,154

(22) Filed: Sep. 13, 2017

(65) Prior Publication Data
US 2018/0143097 A1 May 24, 2018

Related U.S. Application Data

(60) Provisional application No. 62/423,983, filed on Nov. 18, 2016.

(51) Int. Cl.
G01M 3/20 (2006.01)
(52) U.S. Cl.
CPC .................... G01M 3/20 (2013.01)
(58) Field of Classification Search
CPC ............ G01M 3/00; G01M 3/04; G01M 3/20
See application file for complete search history.

(56) References Cited

U.S. PATENT DOCUMENTS

| 3,975,634 A | | 8/1976 | Molina | |
|---|---|---|---|---|
| 4,317,996 A | * | 3/1982 | Davis | G01M 3/20 250/302 |
| 4,693,118 A | * | 9/1987 | Roberts | G01M 3/226 73/40.7 |
| 6,155,066 A | * | 12/2000 | Chandler | B05B 11/0005 62/292 |
| 6,177,678 B1 | * | 1/2001 | Brass | F21V 13/08 250/365 |
| 6,183,663 B1 | * | 2/2001 | Kalley | G01M 3/04 252/68 |
| 6,355,935 B1 | * | 3/2002 | Kalley | F21V 15/01 250/504 H |

(Continued)

FOREIGN PATENT DOCUMENTS

WO 2015148990 10/2015

OTHER PUBLICATIONS

Chelliah,K., "Leakage Detection Techniques Using Nearfield Acoustic Holography" Proceedings of the ASME 2014 4th Joint US-European Fluids Engineering Division Summer Meeting, FEDSM2014, Aug. 3-7, 2014, Chicago, Illinois, USA.

(Continued)

Primary Examiner — Nguyen Q. Ha
(74) Attorney, Agent, or Firm — Colin L. Cini; Dan Vacar

(57) ABSTRACT

Provided is a Fluorescent Air Leakage Detection (FALD) system and method for locating a defect in an enclosure that uses a nontoxic fluorescent solution as a marker. The solution is aerosolized with an atomizing device and guided to defects by a gas pressure modifying device. Defects are visually located by surveying the enclosure with an ultraviolet or visible light source and identifying a location where accumulated solution fluoresces.

7 Claims, 8 Drawing Sheets

(56) References Cited

U.S. PATENT DOCUMENTS

| | | | | |
|---|---|---|---|---|
| 6,392,227 | B1* | 5/2002 | Banyard | G01M 3/20 250/302 |
| 7,105,350 | B2* | 9/2006 | Foster | G01M 3/227 436/1 |
| 7,141,811 | B2* | 11/2006 | Trigiani | G01M 3/228 250/504 H |
| 9,116,067 | B1 | 8/2015 | Reid | |
| 10,222,291 | B2* | 3/2019 | Thompson | G01M 3/226 |
| 2002/0096643 | A1* | 7/2002 | Kalley | F21V 15/01 250/458.1 |
| 2008/0218998 | A1* | 9/2008 | Quest | G01M 3/38 362/230 |
| 2016/0003704 | A1* | 1/2016 | Firestone | G01M 17/013 73/40.5 R |

OTHER PUBLICATIONS

Boschi, F., "Luminescence and Fluorescence of Essential Oils. Fluorescence Imaging in Vivo of Wild Chamomile Oil", European Journal of Histochemistry, 2011, pp. 97-100, vol. 55:e18.

Sikorska, E., Analysis of Olive Oils by Fluorescence Spectroscopy: Methods and Applications, Olive Oil—Constituents, Quality, Health Properties and Bioconversions, Dr. Dimitrios Boskou (Ed.), ISBN: 978-953-307-921-9, InTech, http://www.intechopen.com/books/olive-oil-constituents-quality-health-properties-and-bioconversions/analysisof-olive-oils-by-fluorescence-spectroscopy-methods-and-applications, 2012, pp. 63-88.

Chen, R., "Some Characteristics of the Fluorescence of Quinine", Analytical Biochemistry, 1967, pp. 374-387, 19.

* cited by examiner

| Material | Absorbance Values (nm) | Fluorescence Emission (nm) |
|---|---|---|
| Quinine | 200 - 400 | 400 - 600 |
| Essential Oils | 400 - 800 | 500 - 900 |
| Olive Oil | 300 - 700 | 300 - 800 |

FIG. 1

Absorbance and Fluorescence of B Vitamin Suppliments

Table 1 Optical Properties of Individual and Complex Vitamin B Supplements.*

| Vitamin | Common Name | Manufacturer | Vitamin per Tablet (mg) | Absorbance Values (nm) | Fluorescence Emission (nm) | Emission Intensity |
|---|---|---|---|---|---|---|
| $B_1$ | thiamin | A | 500 | ≤300 | 335 | 5.4e5 |
| $B_2$ | riboflavin | B | 100 | 223, 267, 374, 445 | 540 | 2.0e7 |
| $B_3$ | niacin | C | 500 | 222, 268 | 332 | 2.7e5 |
| $B_5$#‡ | pantothenic acid | B | 500 | --- | --- | --- |
| $B_6$ | pyridoxal 5' phosphate | C | 100 | 291, 324 | 390, 776 | 1.0e6 |
| $B_7$#‡ | biotin | A | 5.0 | --- | --- | --- |
| $B_9$ | folic acid | D | 0.4 | 254, 279, 349 | 450 | 4.2e5 |
| $B_{12}$ | cyanocobalamin | E | 5.0 | 210, 279, 306, 324, 361 | 412 | 5.3e4 |
| $B_{12}$ | cyanocobalamin | F | 2 mg/mL | 270 | 393 | 1.1e5 |
| Vitamin B complex | $B_2, B_3, B_5, B_6, B_7, B_9, B_{12}$ | D | 20, 25, 5.5, 2, 0.03, 0.4, 0.015 | 264, 374, 445 | 550 | 1.8e7 |

*One tablet of each supplement was dissolved in 250 mL of water. #Illustrated no absorbance. ‡Illustrated no fluorescence.

FIG. 2

FLUORESCENT AIR LEAKAGE DETECTION SYSTEM FOR ENCLOSURES

CROSS-REFERENCE TO RELATED APPLICATIONS

This application claims priority to U.S. provisional patent application Ser. No. 62/423,983 filed on 18 Nov. 2016, which is incorporated herein by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

BACKGROUND OF THE INVENTION

1. Field of the Invention

This application relates to the inspection of enclosures for defects and more specifically to systems, methods and kits for locating air leaks in such enclosures.

2. Description of the Related Art

Improving the airtightness of buildings is one of the most cost-effective strategies to decrease energy use. However, effective deployment of air sealing technologies has been hindered by the limited viability of current tools for locating air leaks. There are presently a few standard methods for locating leak sites. One such method involves pressurizing or depressurizing the building with blower doors or fans, and using an infrared or thermal camera on the exterior or interior space of the building to find areas experiencing temperature gradients due to airflow. In this method, a temperature differential of about 20° F. is generally needed and the sun should not be shining on exterior areas that are being inspected. In another method, the building is pressurized and smoke is released within the interior space to locate the leaks. With this method, the smoke needs to be released relatively close to a leak with a smoke pencil or theatrical smoke machine, because the smoke dissipates quickly in the building.

Recent developments in air leak detection and sealing in buildings include the use of aerosolized sealants and ultrasound techniques. Harrington and Modera, WIPO Published Patent Application WO/2015/148990, describe a system that atomizes a sealant and directs the sealant to leaks by pressurizing the building so that airflow decreases as the sealant fills the leaks. Chelliah K, Raman G, Muehleisen R T, "Leakage Detection Techniques Using Nearfield Acoustic Holography", describe a system that uses sound waves to detect leaks.

Despite recent advances in leak detection methods, new methods and systems are needed to advance the art of detecting leaks in residential and commercial buildings and other enclosures in general.

BRIEF SUMMARY OF THE INVENTION

Disclosed are several examples of systems, methods and kits for detecting air leakage in buildings and enclosures.

The following summary is provided to facilitate an understanding of some of the innovative features unique to the embodiments and is not intended to be a full description. A full appreciation of the various aspects of the embodiments disclosed can be gained by reviewing the entire specification, drawings, claims, and abstract.

A system for locating a defect in an enclosure includes: a pressure modifying device for creating a pressure differential between an interior space and an exterior space of the enclosure; an atomizing device for aerosolizing a nontoxic fluorescent solution within the higher-pressure space; and a light source for emitting wavelengths of light between about 200 nm and about 800 nm for illuminating the enclosure such that any accumulated solution fluoresces to identify a defect location.

A method for locating a defect in an enclosure includes the steps of: a) mixing a nontoxic fluorescent material and a liquid solvent into a solution; b) creating a pressure differential between an interior space and an exterior space of the enclosure with a pressure modifying device while aerosolizing the solution in the higher-pressure space with an atomizing device; c) illuminating the enclosure with a light source that emits wavelengths of light between about 200 nm and about 800 nm; and d) identifying the defect location on the enclosure where the accumulating solution fluoresces when illuminated with the light source.

A kit for locating a defect in an enclosure includes at least: a nontoxic fluorescent material; an atomizing device; and a light source that emits a wavelength of between about 200 nm and about 800 nm.

BRIEF DESCRIPTION OF THE SEVERAL VIEWS OF THE DRAWING(S)

The systems, methods and kits of the present disclosure may be better understood with reference to the following drawings and detailed description. The components in the figures are not necessarily to scale, emphasis instead being placed upon illustrating principles. In the figures, like referenced numerals may refer to like parts throughout the different figures unless otherwise specified.

FIG. 1 is a table that lists the absorbance and emission values of a few exemplary nontoxic materials.

FIG. 2 is a table that lists the absorbance and emission values of individual and complex vitamin B supplements.

DETAILED DESCRIPTION OF THE INVENTION

A Fluorescent Air Leakage Detection (FALD) system, method and kit for inspecting enclosures for defects such as air leaks is now described in detail. Exemplary enclosures include: all residential buildings, commercial buildings, industrial buildings, storage tanks, pipes, motor vehicles, trains, aircraft, ships, inflatable devices and other enclosures that have an interior space that is separated from an exterior space by an envelope structure such as a wall, body or other divider.

The FALD system utilizes nontoxic fluorescent materials dissolved in solvents as tracers for locating defects in enclosures. These nontoxic materials cause no harmful effects to humans or animals and are ideally suited for this application. Exemplary nontoxic fluorescent materials include FDA approved limits of quinine, essential oils, olive oil and B vitamins, for example.

As illustrated by the table of FIG. 1, measured light absorbance and fluorescence emission values of a few exemplary nontoxic materials are provided. These nontoxic materials have light absorbance values of between about 200 nm and about 800 nm and fluorescence emission values of between about 300 nm and about 900 nm.

As illustrated by the table of FIG. 2, B vitamins have light absorbance values of between about 200 nm and about 450 nm and fluorescence emission values of between about 330 nm and about 800 nm. B vitamin supplements are readily available in tablet, powder or liquid form and, when mixed with a liquid solvent such as water for example, dissolve into a solution.

Figure 3:
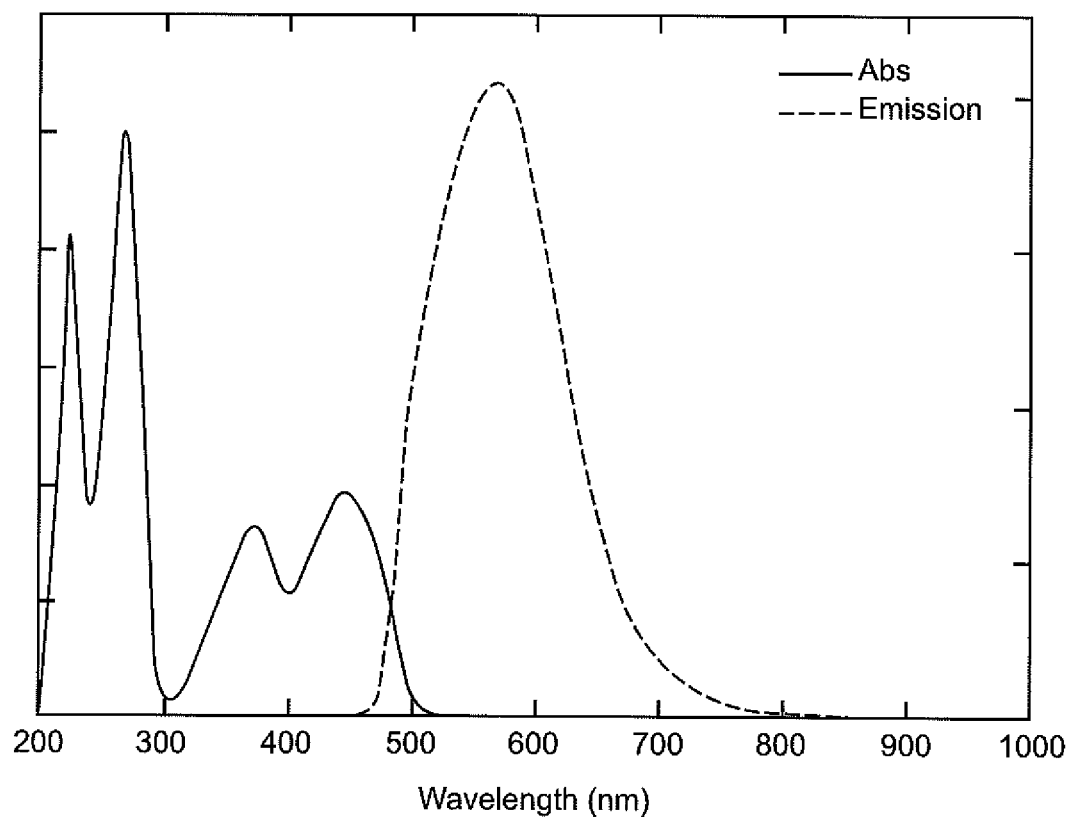
FIG. 3 is a plot of the absorbance and emission spectra of an exemplary vitamin $B_2$ supplement.
Figure 4:
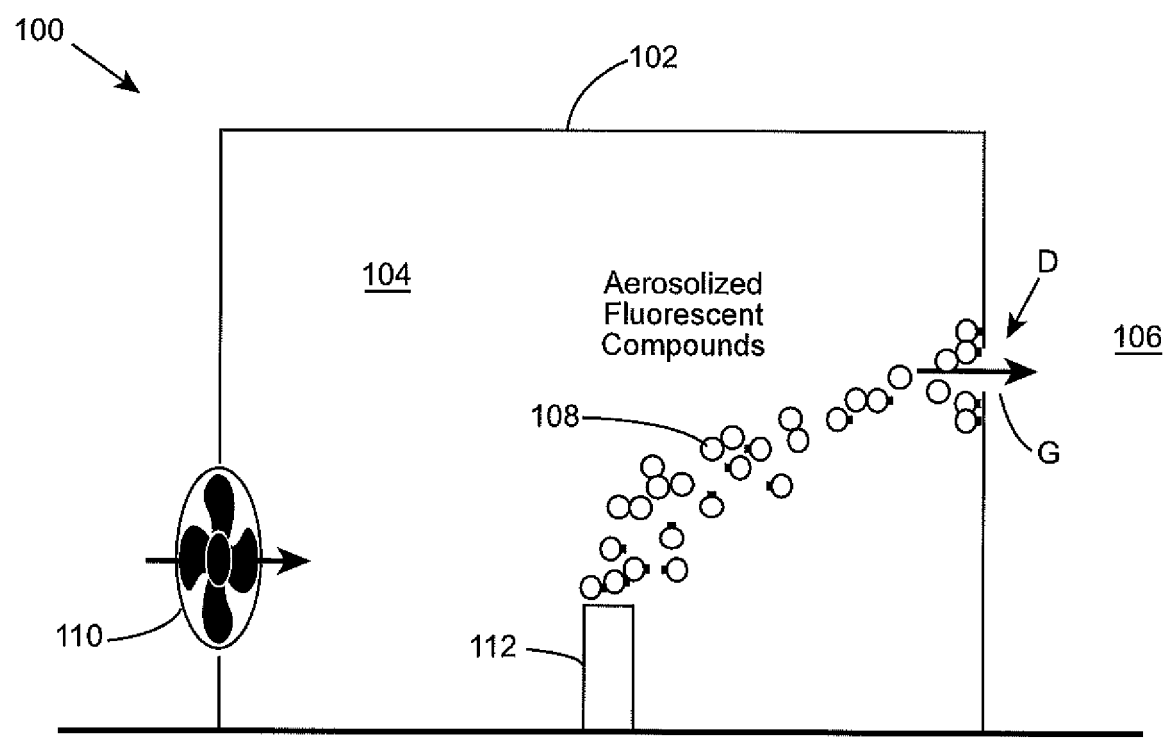
FIG. 4 is an illustration of an exemplary system and method as an aerosolized nontoxic fluorescent solution is directed to a defect inside of an enclosure.
Figure 5:
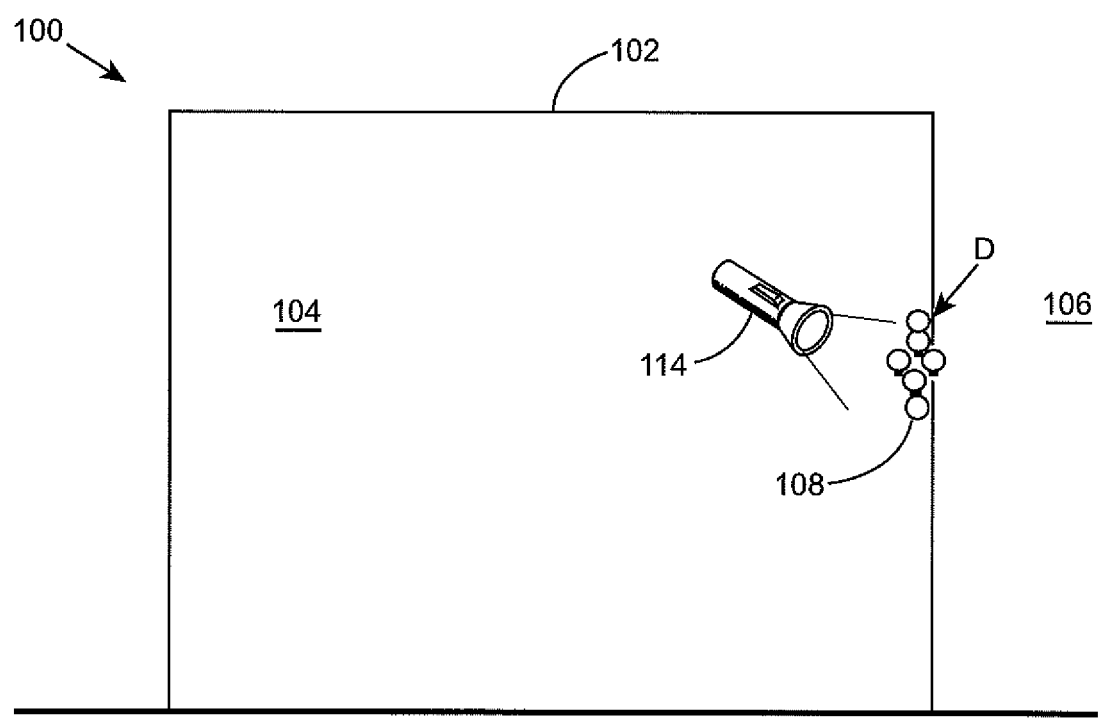
FIG. 5 is an illustration of an exemplary system and method of FIG. 4 as accumulated solution fluoresces when exposed to a UV light source.
Figure 6:
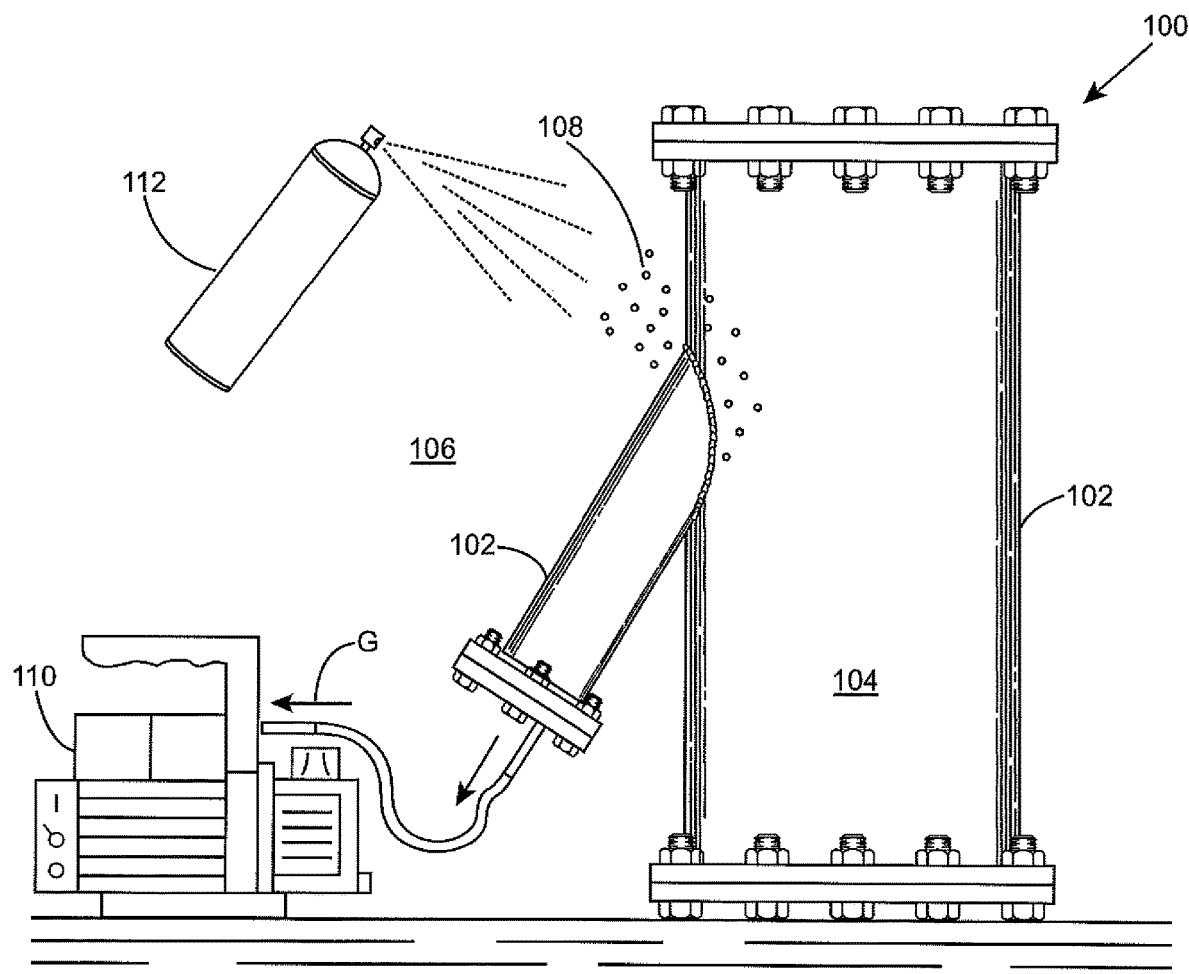
FIG. 6 is an illustration of an exemplary system and method as an aerosolized nontoxic fluorescent solution is directed to an exterior space of an enclosure.
Figure 7:
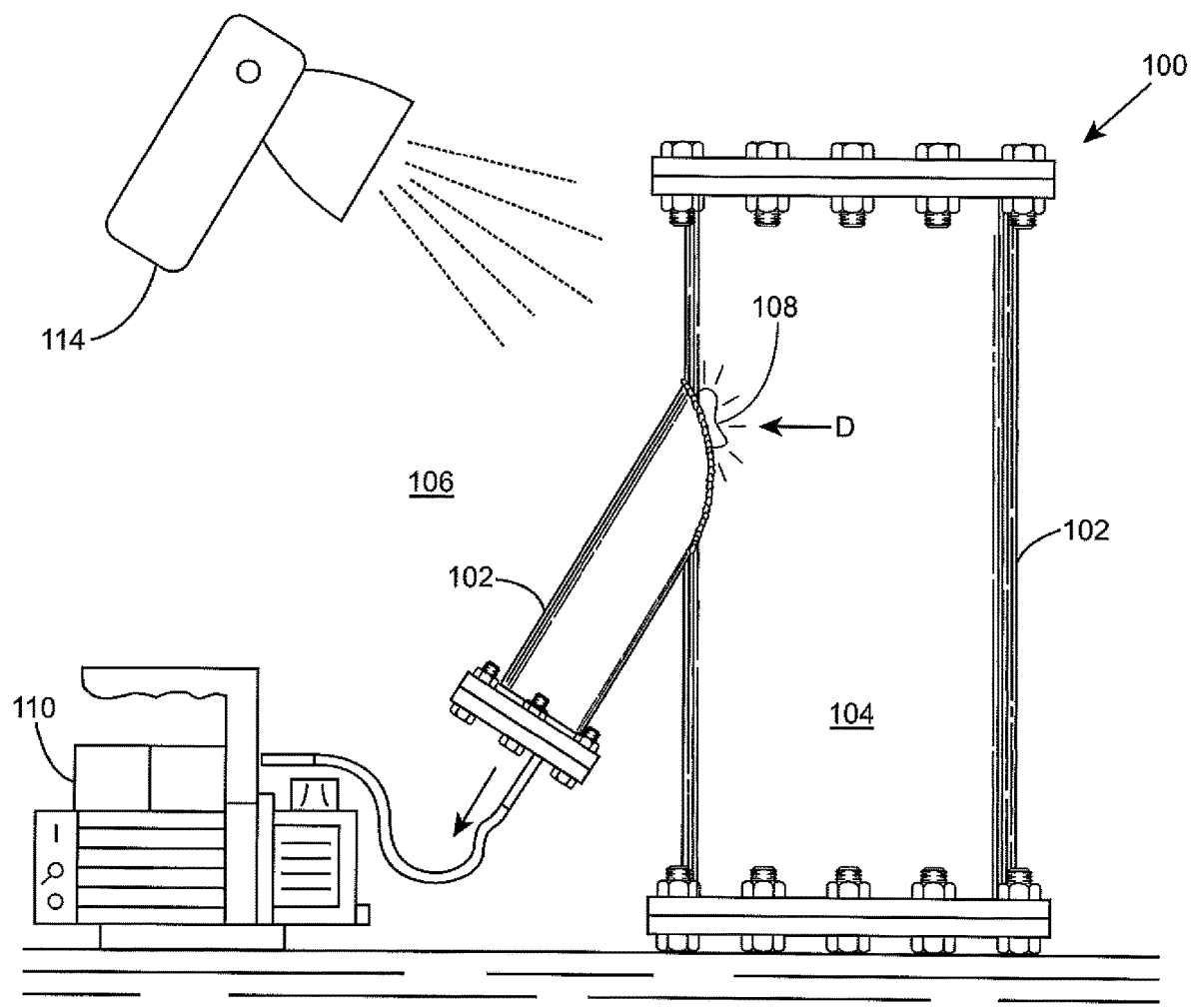
FIG. 7 is an illustration of an exemplary system and method of FIG. 6 as accumulated solution fluoresces when exposed to a UV light source.

The absorbance and emission spectra of a sample of vitamin $B_2$ (riboflavin) is shown in FIG. 3. The absorbance spectrum shows what the optimal illumination wavelengths are to produce the strongest fluorescence signal for a specific material. By knowing what the emission band is for a given fluorescent material, a user can determine how to best detect the air leak. For example, if the B vitamin in this example has an emission band at 575 nm, then a user can specifically target that wavelength by using a 575 nm notch filter. Therefore, the notch filter allows the user to see light at 575+/−25 nm. This way it helps improve the fluorescent signal to noise ratio and increases the detection sensitivity.

Referring now to FIGS. 4-7, an enclosure 100 of any shape and size includes an envelope 102, such as a wall, body or divider, that is made of a single or a combination of materials such as wood, metal, concrete, brick, glass, plastic, composite or other materials. The enclosure 100 defines an interior 104 space that is physically separated from an exterior 106 space, which may comprise a gas (G) such as air for example. In an ideal state, the envelope 102 contains no defects (D) such as cracks, gaps, holes, tears, leaks or other penetrations that fluidly connect the interior 104 and the exterior 106 spaces. When a positive or a negative pressure differential exists between the gases (G) in the interior 104 and the exterior 106 spaces, then flowing gas (G) can be used as a conduit for depositing a volume of nontoxic fluorescent solution 108 to the defect (D) location.

A gas (G) pressure modifying device 110 produces the pressure differential between the interior 104 and the exterior 106 spaces to create the flow of gas (G). For a positive pressure differential, a compressor, a blower door, or a fan of a heating, ventilation, and air conditioning (HVAC) system may be used to pressurize the gas (G) in the interior 104 space to a pressure that is greater than the gas (G) pressure of the exterior 106 space. Typically, the gas (G) pressure of the exterior 106 space is at atmospheric pressure. This setup is primarily used for buildings and other large enclosures 100 that have an interior 104 space that is large enough to allow access by a technician or inspector. In some examples, the positive pressure differential between the interior 104 and the exterior 106 spaces is between 10 Pa and 25 Pa. In other examples, the positive pressure differential between the interior 104 and the exterior 106 spaces is between 25 Pa and 100 Pa.

For small or otherwise inaccessible enclosures 100 having an interior 104 space that is not large enough to accept a technician or inspector, a negative pressure differential between the interior 104 space and the exterior 106 space is generated. In the specific example of FIGS. 6 and 7, the pressure modifying device 110 includes a vacuum pump that is fluidly coupled to the gas (G) in the interior 104 space via a fitting. In this example, the pressure of the gas (G) in the interior 104 space is decreased to a pressure that is lower than the pressure of the gas (G) in the exterior 106 space, which may be at atmospheric pressure for example. This setup is primarily used for pipelines, tanks and other enclosures 100 that have limited or no access to the interior 104 space. In some examples, the positive pressure differential between the exterior 106 and the interior 104 spaces is between 10 Pa and 25 Pa. In other examples, the positive pressure differential between the exterior 106 and the interior 104 spaces is between 25 Pa and 100 Pa.

Figure 8:
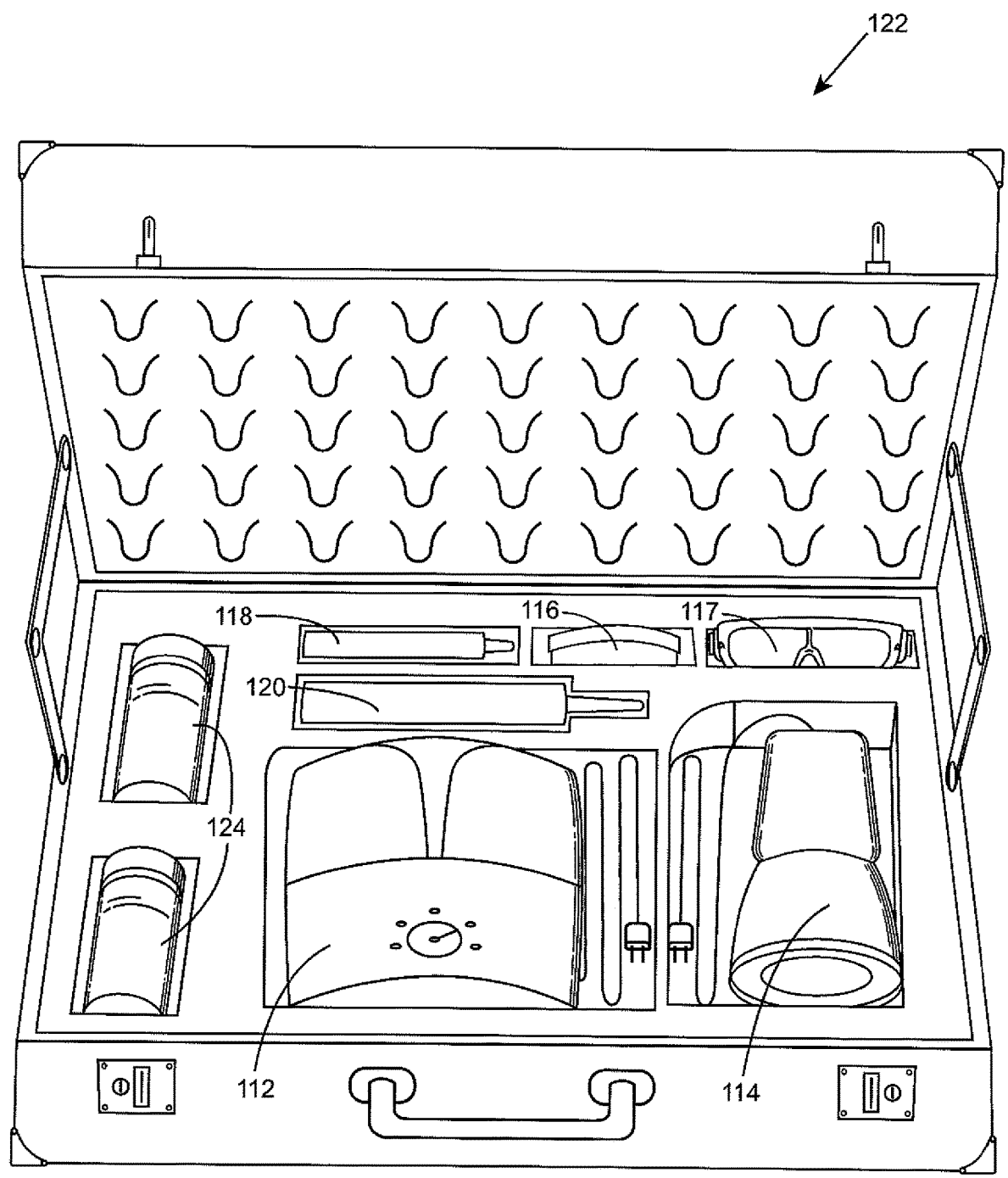
FIG. 8 is an illustration of an exemplary kit for providing the systems and methods of FIGS. 4-7.

A volume of nontoxic fluorescent material and solvent solution 108 is transferred to an atomizing device 112, located within the higher-pressure space as described above, and then aerosolized. Preferably, the atomizing device 112 produces droplets of nontoxic solution 108 with aerodynamic diameters of between about 0.15 μm and about 0.30 μm, which have a half-life settling time of greater than 40 hours. In another example, a droplet aerodynamic diameter of about 3 μm has a settling time of approximately 1.5 hours. The half-life settling time is a function of the aerodynamic diameters of the droplets, so other droplet aerodynamic size ranges are contemplated as well. Consequently, the particles of nontoxic material will be transported by the conduit of flowing gas (G) to the defects (D). The atomizing device 112 may be an atomizer, a nebulizer, a humidifier or an aerosol canister, and may use, for example, heat, ultrasonic energy or a pressurized gas to atomize the nontoxic fluorescent solution 108. For accessible enclosures 100, such as buildings, the atomizing device 112 is typically located within the interior 104 space as depicted in FIG. 4 and for inaccessible enclosures 100, such as pipelines or storage tanks, the atomizing device 112 is located within the exterior 106 space as depicted in FIG. 6.

While inspecting small enclosures 100, the pressurizing and atomizing steps may be performed for up to 10 minutes or more, and while inspecting larger enclosures 100, the pressurizing and atomizing steps may be performed for up to 60 minutes or more for example. After a time that is determined to be sufficient for the nontoxic fluorescent solution 108 to accumulate at any defects (D), the atomizing device 112 and the pressure modifying device 110 are each powered off, and the pressure between the interior 104 and exterior 106 spaces normalizes.

To visually identify the locations of any defects (D), an ultraviolet or visible light source 114 is used to survey the envelope 102 and illuminate any nontoxic fluorescent solution 108 that has accumulated at defects (D). The identification is preferably done with the visible lights off to provide for maximum contrast. To improve the signal-to-noise ratio, a notch filter 116, FIG. 8, may be used with the ultraviolet or visible light source 114 to reduce background emissions. Notch filters, also commonly referred to as band-stop or band-rejection filters, are designed to transmit most wavelengths with little intensity loss while attenuating light within a specific wavelength range (the stop band) to a very low level. In other examples, light filtering goggles 117, FIG. 8, are worn by the technician or inspector as a filter to reduce background noise. In one example, an ultraviolet or visible light source 114 producing a wavelength between about 200 nm and about 900 nm is used to make the nontoxic solution 108 that has accumulated at any defects (D) fluoresce. In another example, an ultraviolet or visible light source 114 producing a wavelength up to about 800 nm is used. In another example, an ultraviolet light source 114 producing a wavelength of about 365 nm is used. Other wavelengths of light may be used to illuminate the specific fluorescent materials in the tables of FIGS. 1 and 2.

Once the defect (D) locations are identified with the disclosed FALD system and method, the locations can be marked using a marking device 118 such as a grease pencil, a felt-tipped marker, masking tape, pin or some other marking device known in the art. Marking a defect (D) allows it to be more readily located under visible light. The defect (D) can now be filled with a sealant 120 such as caulking, epoxy, tape or another sealant known in the industry. In other examples, a defect (D) in a pipeline or storage tank enclosure 100 can be further inspected and/or mechanically repaired to seal the defect (D). After the defects (D) are sealed, the air leakage rate of the enclosure 100 can be measured with a conventional blower door or other leakage test to determine if further defects exist and the FALD method should be repeated.

As illustrated lastly in FIG. 8, the FALD system components can be conveniently packaged in a kit 122 for use by homeowners, builders, inspectors, energy auditors, or quality control inspectors. The kit 122 includes a volume of a nontoxic fluorescent material 124 in powder, capsule or liquid form, an atomizing device 112 and an ultraviolet or visible light source 114 as fully described above. The nontoxic fluorescent material 124 can be mixed with a solvent such as water, on site, to produce a nontoxic solvent solution 108 for atomization. In other examples, the kit 122 may contain a premixed volume of a nontoxic solvent solution 108. In other examples, the kit 122 may contain a pressure modifying device 110, such as a blower door, a fan or a vacuum pump as fully described above. In other examples, the kit 122 includes one or more of a notch filter 116, light filtering googles 117, a marking device 118 and a sealant 120.

The FALD system was demonstrated at Oak Ridge National Lab on a test enclosure 100 with an interchangeable lid that was modified to include various types of defects (D) such as holes, cracks and the like. A variable-speed fan 110 (Energy Conservatory Duct Blaster) was connected to the envelope 102 to control the flow rate through the defects (D). A pressure and flow gauge (Energy Conservatory DG 700) measured the airflow through the fan 110 and the pressure differential between the interior 104 and the exterior 106 spaces. An ultrasonic humidifier 112 (PureGuardian H4610) holding a nontoxic fluorescent solution 108 comprising 75% water and 25% ethanol and a 33 ppm concentration of $B_2$ vitamin was placed in the interior 104 space.

An optical particle sizer (TSI OPS 3330) and a scanning mobility particle sizer spectrometer (TSI SMPS 3910) were used to measure the aerodynamic diameter of the droplets that were emitted by the atomizing device 112. Most of the droplets ranged from 0.15 µm to 0.3 µm, which have a half-life settling time greater than 40 hours.

The atomizing device 112 aerosolized about 4.8 ounces of the nontoxic fluorescent solution 108 while it ran for about 1 hour. Airflow through the defects (D) was set very high at 8 cfm to avoid the potential for condensation given the disproportionately small ratio of interior 104 volume to humidifier 112 emission rate. The fluorescence of the accumulated B vitamin particles under 365 nm light clearly traced the location of the example defects (D), which successfully proved the viability of the FALD system.

The FALD system was also demonstrated on a larger-scale test chamber 100 at Oak Ridge National Lab. The atomizing device 112 aerosolized approximately 1.6 Liters of 33.3 ppm B vitamin solution 108 while airflow was set at approximately 3.8 L/s. The fluorescence of the accumulated B vitamin particles under 450 nm light clearly identified the location of an approximately 1.6 mm sized gap (D), which again successfully proved of viability of the FALD system.

Benefits of the disclosed system, method and kit include leveraging of existing blower door tests so that air leaks are located and sealed, and infiltration rates are measured immediately. Energy efficiency auditors can implement the method with minimal alterations to their procedures and with the acquisition of an inexpensive kit (e.g., nontoxic fluorescent materials, liquid, atomizing device, ultraviolet or visible light source, light filtering goggles). The method is suitable for individual rooms or an entire building. The method is agnostic to the outdoor conditions and is not affected by indoor-to-outdoor temperature differentials. The method is benign to furnished buildings since the aerosolized solution that deposits on surfaces is only visible under UV illumination. The method can be configured into an air leak detection kit for building enclosures that is used by maintenance crews if they can pressurize buildings and direct the tracer with the existing air handling unit of an HVAC system.

While this disclosure describes and enables several examples of systems, methods and kits for detecting air leakage in buildings and enclosures in general, other examples and applications are also contemplated. Accordingly, the invention is intended to embrace those alternatives, modifications, equivalents, and variations as fall within the broad scope of the appended claims. The technology disclosed and claimed herein may be available for licensing by the original assignee of record.

A video of the FALD system and method can be viewed by entering the following address into an internet web browser: https://www.youtube.com/watch?v=6yOY7BTQ_YE.

What is claimed is:

1. A method for locating a defect in an enclosure of a residential building or a commercial building, the method comprising the steps of:
   a. mixing a nontoxic fluorescent material and a liquid solvent into a solution;
   b. creating a pressure differential between an interior space and an exterior space of the enclosure with a gas pressure modifying device while aerosolizing the solution in the higher-pressure space with an atomizing device, wherein the aerosolizing generates droplets of solution with aerodynamic diameters of between about 0.15 µm and about 0.30 µm;
   c. illuminating the enclosure with a light source that emits wavelengths of light between about 200 nm and about 800 nm; and
   d. identifying a defect location where the accumulated solution fluoresces when illuminated with the light source.

2. The method of claim 1 wherein the liquid solvent of step a. is water.

3. The method of claim 1 wherein the atomizing device of step b. is selected from the group consisting of an atomizer, a nebulizer, a humidifier and an aerosol canister.

4. The method of claim 1 wherein the gas pressure differential creating of step b. is performed by a gas pressure modifying device selected from the group consisting of a compressor, a blower door, an HVAC system and a vacuum pump.

5. The method of claim 1 wherein step b. is performed for at least 10 minutes.

6. The method of claim 1 wherein the illuminating step c. includes using a notch filter to reduce background spectra emissions.

7. The method of claim 1 wherein the nontoxic fluorescent material of mixing step a. is selected from the group consisting of B vitamin, quinine, essential oils, and olive oil.

\* \* \* \* \*